Figure 5:
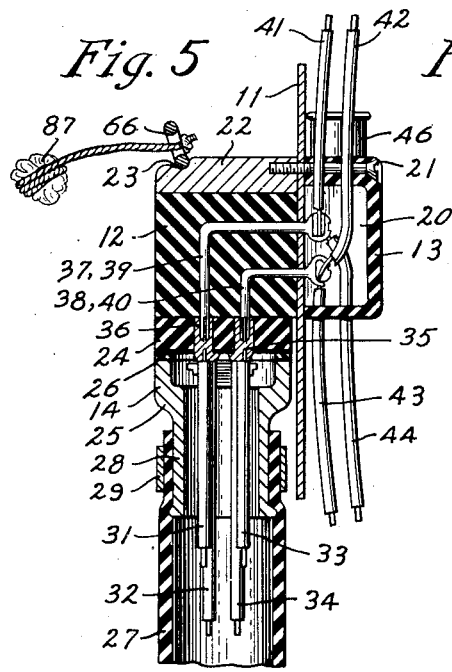

Nov. 27, 1945. R. S. COLLEY ET AL 2,389,895
DETACHABLE JUNCTION BOX FOR INFLATABLE SUITS
Filed June 3, 1942 2 Sheets-Sheet 1
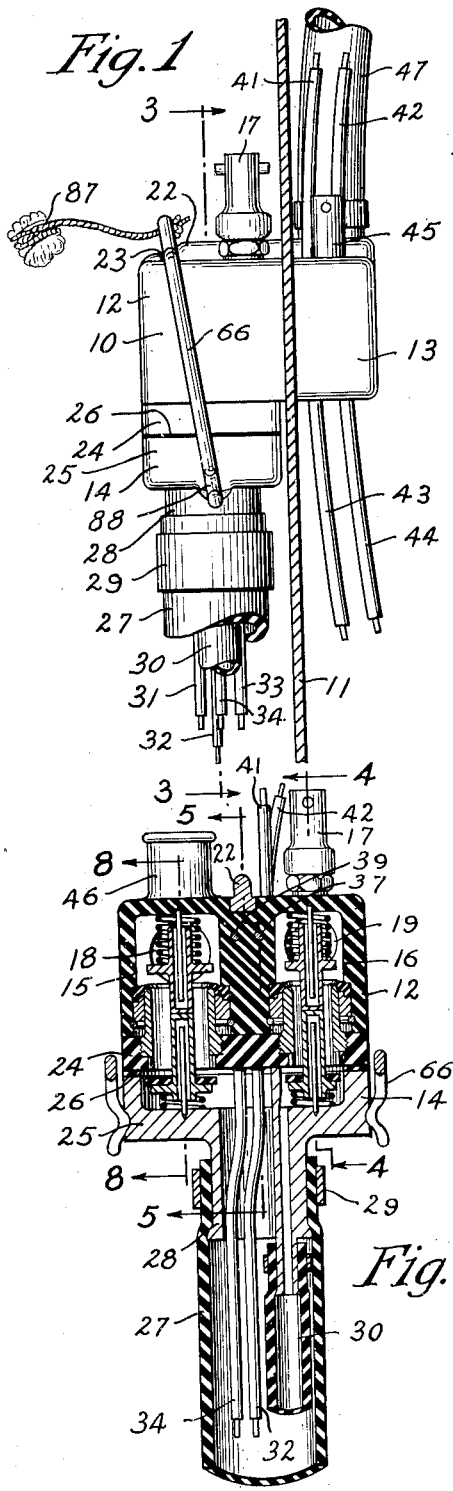
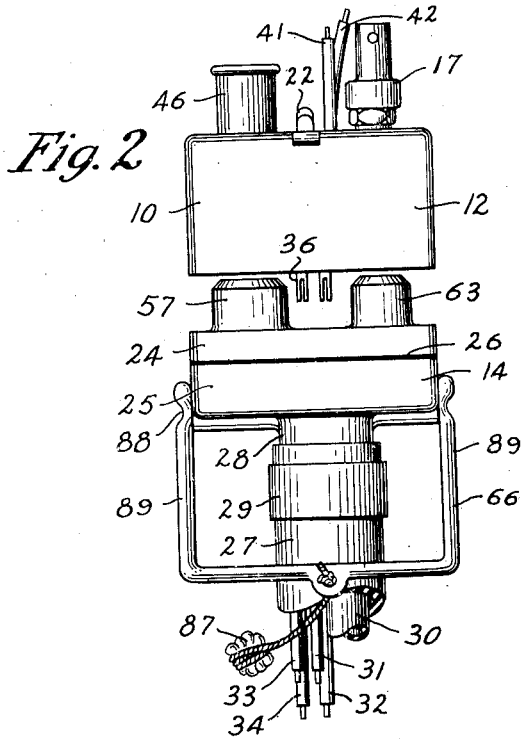
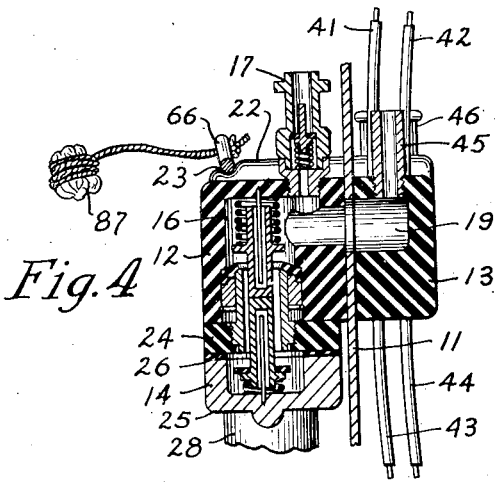
INVENTORS:
Russell S. Colley, and
Carroll P. Krupp,
Willis F. Avery
ATTORNEY Nov. 27, 1945.   R. S. COLLEY ET AL   2,389,895
DETACHABLE JUNCTION BOX FOR INFLATABLE SUITS
Filed June 3, 1942   2 Sheets-Sheet 2

INVENTORS:
Russell S. Colley, and
Carroll P. Krupp

Willis F. Avery
ATTORNEY

Patented Nov. 27, 1945

2,389,895

UNITED STATES PATENT OFFICE 2,389,895

DETACHABLE JUNCTION BOX FOR INFLATABLE SUITS

Russell S. Colley, Kent, and Carroll P. Krupp, Akron, Ohio, assignors to The B. F. Goodrich Company, New York, N. Y., a corporation of New York Application June 3, 1942, Serial No. 445,586

5 Claims. (Cl. 174—21)

This invention relates to separable connectors for interconnecting conduits and especially to detachable junction boxes for inflatable suits.

It is desirable that an inflatable suit for persons who fly at high altitudes and especially in the region of the stratosphere, be adapted for detachably interconnecting the same with sources of fluid, such as pressurized air and oxygen, and with sources of electrical energy, and be adapted for providing for convenience and safety of use and for providing for effective protection of the wearer against low temperatures, oxygen deficiency, and other factors, which have a physiological effect during flight at the higher levels. It is advantageous to have all conduits, for fluid and for electricity, extend through the wall of the suit at one conveniently accessible location, thus eliminating multiple manual operations in coupling or uncoupling the several conduits, especially in an emergency period. Since the wearer may be encased completely and may be shielded from direct audible communication with other persons, reliable means of communication is desirable.

To these ends, objects of the invention are to provide a connector for mounting a conduit at one side of the wall of a hollow article in communication with the other side of said wall, and to provide a detachable junction box for interconnecting electrical conduits and for interconnecting fluid conduits through the wall of an inflatable suit, whereby electrical energy and a fluid, such as air, from exterior sources are conducted into the suit.

Other objects are to provide a separable junction box for a hollow body for the connection of respective fluid conduits and electrical conduits, which is engaged and disengaged by movement generally in the direction along the wall of the body so that space limitations do not handicap convenient manipulation, and to provide a separable connector for interconnecting fluid conduits which provides against leakage of fluid upon the disengagement of the connector.

Further objects are to provide a detachable junction box for an inflatable suit which is compact and accessible for use, and which does not require multiple manual operations in coupling or uncoupling a plurality of fluid conduits and a plurality of electrical conduits, and to provide a durable junction box having simplicity of construction and ease of manufacture and having convenience and reliability of operation.

More specific objects are to provide a detachable junction box for interconnecting respective fluid conduits and electrical conduits through the wall of an inflatable suit, which permits the flow of fluid and of electrical energy upon the engagement of the several elements comprising the box, and which effectively stops the flow of the fluid and the electrical energy upon the disengagement of the elements; to provide for conducting fluid from an exterior source into the suit during an emergency period despite the disengaged condition of the junction box; and to provide for the interconnecting of parts, such as microphones and earphones of radio or telephone communication systems, within the suit to components of such systems as may be located elsewhere.

These and other objects and advantages of the invention will be apparent from the following description.

Figure 7:
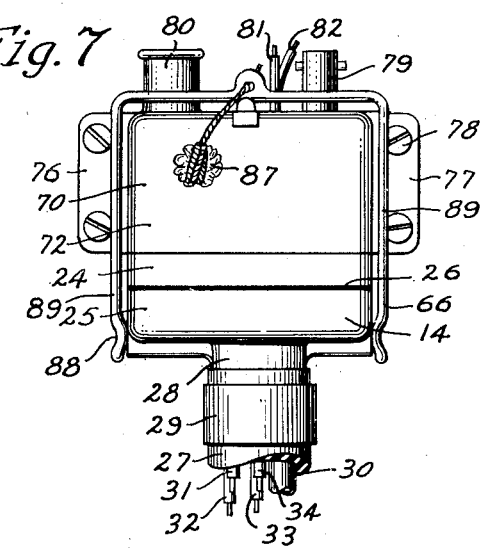
Figure 6:
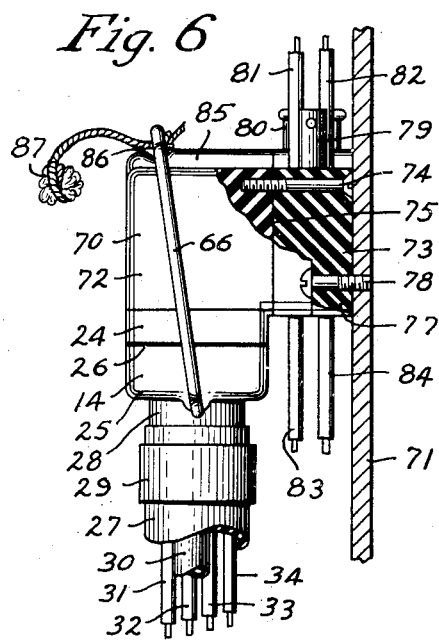
Figure 8:
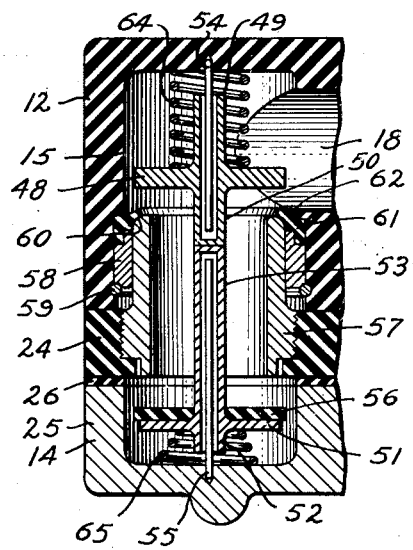

In the accompanying drawings, which form a part of this specification, and in which like numerals are employed to designate like parts throughout the same, Fig. 1 is a side elevation, with parts sectioned and broken away, of a detachable junction box constructed in accordance with and embodying the invention, elements thereof being in engagement, Fig. 2 is a front view of the junction box with the elements disengaged, Fig. 3 is a section taken along line 3—3 of Fig. 1, Fig. 4 is a section taken along line 4—4 of Fig. 3, Fig. 5 is a section taken along line 5—5 of Fig. 3, Fig. 6 is a side elevation of a modification of the junction box, parts being broken away, Fig. 7 is a front view of the junction box shown in Fig. 6, and Fig. 8 is an enlarged section taken along line 8—8 of Fig. 3 showing a valve structure with sealing means.

The use of a detachable junction box 10 having fluid conduits and electrical conduits, like that shown in Figs. 1 and 2, is desirable in order to provide for the effective functioning of the inflatable suit in the region of the stratosphere. Fluid conduits permit the introduction into the interior of the suit of oxygen and air under a pressure exceeding that of the atmosphere. Oxygen is desirable to compensate for the decrease in the mass oxygen content in the air being breathed, the amount of oxygen available being proportional to the air density and the rate of absorption by man being governed by the partial pressure of the oxygen in the atmosphere. Air under a pressure greater than atmospheric is required within the inflatable suit to maintain a pressure upon the body of the wearer equivalent to that pressure of the air existing at lower levels where effective and safe flight may be had. The electrical conduits permit the use of electricity for maintenance of body warmth, for example, by means of a resistance-heated suit, and permit the interconnecting of electrical parts, such as microphone and earphones of radio and telephone communication systems, with other parts of the systems as may be located elsewhere.

Fig. 1 illustrates an embodiment of the invention whereby fluids, such as air and oxygen, and electrical energy may be conducted through the wall 11 of an inflatable suit by means of conduits in elements 12 and 13 and in a terminal element 14. The engagement and the disengagement of the element 12 with the terminal element 14 by movement generally in the direction along the wall 11 of the suit eliminates objectionable pressure upon the body of the wearer during the engaging operation and minimizes space requirements, and permits separably interconnecting exterior conduits from sources of supply of the fluids and electrical energy with corresponding conduits within the suit. Upon the engagement of the elements 12 and 14 a spring type bail 66 pivotally mounted at 88 may be disposed in a depression 23 in a rib 22, and may be utilized to restrain separating movement of the elements 12 and 14. The spring bail 66 is substantially U-shaped upon engagement with the terminal 14, but upon disengagement therefrom, the leg portions 89 having inwardly extending projections at their ends assume a converging position toward each other. By virtue of this position the legs exert an inward pressure upon the terminal 14, when the projections are disposed in depressions in the terminal 14 to provide for a pivotal mounting at 88 for the bail 66.

The detachable junction box 10 which is compact and small in size and which may be mounted in a conveniently accessible location on the suit, provides against leakage of fluid upon the disengagement of the element 12 and the terminal element 14 by means of valve structures 15 and 16, shown in Figs. 3 and 8, parts of the structures being disposed in the element 12 and parts being disposed in the terminal element 14, thus effectively preventing the escape of fluids from and the reduction of pressure within the suit and the escape of fluids from the sources of supply of the latter. An additional safety feature, besides that of fluid leakage prevention, is provided by the junction box 10 by means of a fluid conduit 17 in the element 12 in communication with the fluid conduit 19, as shown in Fig. 4, whereby fluid, such as oxygen, may be supplied to the wearer of the suit from a supplementary portable source during a period of emergency—for example, a parachute descent to the earth from the stratosphere.

As shown in Figs. 3, 4, and 5, spaced-apart apertures are provided in the wall 11 of the inflatable suit in register with an air conduit 18, an oxygen conduit 19, an electrical conduit chamber 20, and screw fasteners 21 in the elements 12 and 13. These elements 12 and 13 may be secured together in register and sealed to the flexible material of the wall 11 by a suitable adhesive, such as rubber cement, and by the screw fasteners 21. The terminal element 14 may be made in two parts, an upper element 24 and a lower element 25, with a rubber gasket seal 26 adhered to and interposed between the parts, and may be attached in abutting contact with the element 12 as hereinabove described.

A fluid conduit 27, such as a flexible, reinforced-rubber hose, may be secured to a tubular projection 28 of the terminal 14 part 25 by a suitable flat band fastening means 29; the conduit 27 may be interconnected with a source of pressurized air and with the air conduit 18 in the elements 12, 13, and 14, which is is communication with the inside of the inflatable suit upon the engagement of the elements 12 and 14. In like manner, a suitable flexible fluid conduit 30, which is enclosed within the conduit 27, is secured to the part 25 and is interconnected with a source of oxygen and with the oxygen conduit 19 in the elements 12, 13, and 14 in communication with the interior of the suit. As shown in Figs. 3 and 5, a plurality of electrical conduits, such as a conduit 31 for earphones, a conduit 32 for the microphone, and a pair of conduits 33 and 34 for the electrically heated suit, may be disposed within the fluid conduit 27, and are connected to spaced-apart socket elements 35 in the terminal part 24, which are adapted for separable engagement with prong elements 36 of respective spaced-apart conduits 37, 38, 39, and 40 in the element 12.

Within the inflatable suit, electrical conduits 41, 42, 43 and 44 for the earphones, the microphone, and the heated suit, respectively, are secured in the chamber 20 of the element 13 to the projecting ends of the corresponding conduits 37, 38, 39 and 40 in the element 12, and extend therefrom through suitable openings in the walls of the chamber 20, as illustrated in Figs. 1 and 5. Furthermore, the element 13 inside the suit may be provided with a connector member 45 for coupling a hose, for example, to the oxygen conduit 19, and provided with another connector member 46 for coupling a hose 47 to the air conduit 18.

In Figs. 3, 4, and 8 the valve structures 15 and 16, which regulate the flow of fluids, such as air and oxygen, and which are substantially alike in construction, are shown with the parts in the elements 12 and 14 in operative engagement, whereby fluid is permitted to flow through the conduits 18 and 19. As shown in Fig. 8, the element 12 has a valve disc 48 having an integral hollow stem 49 with a closed end 50; likewise the terminal element 14 has a valve disc 51 having an integral hollow stem 52 with a closed end 53. The hollow stems 49 and 52 may be retained in axial alignment by fixed guide pins 54 and 55 which are secured to the elements 12 and 14 respectively, and which extend into the hollow portion of the stems and slidingly engage therewith; hence transverse movement of the valve discs 48 and 51 and the stems 49 and 52 is prevented effectively. When the elements 12 and 14 are in engagement, the closed ends 50 and 53 of the stems are accordingly in abutting contact intermediate the discs so that the latter are maintained in the open position.

A disc seal 56 of rubber-like material may be secured to a face of the valve disc 51 to provide for seating of the latter against a face of the upper element 24 of the terminal 14. An outwardly extending sleeve 57 (63) may be attached to the terminal element 14 (24) to provide for sliding engagement with a valve seat 58, which is secured in position in the element 12 by a snap ring fastener 59; also to provide for contiguous engagement of a beveled end face 60 of the sleeve 57 with an annular sealing ring 61 of rubber-like material. The sealing ring 61 of rubber-like material is adjacent and interposed between the valve seat 58 and the disc valve 48, the ring having an inwardly extending flange 62, which may be bent to provide for sealing contact with the beveled end 60 of the sleeve 57 upon the engagement of the elements 12 and 14.

When the elements 12 and 14 are disengaged, a compression spring 64 interposed between the valve disc 48 and the wall of the element 12 moves the valve 48 to the closed position, in which position the valve is seated against the sealing ring 61 and the valve seat 58, effectively preventing leakage of fluid. In like manner, a compression spring 65 interposed between the valve disc 51 and the wall of the lower element 25 of the terminal 14 moves the valve 51 to the closed position, in which position the valve and the disc seal 56 are seated against a face of the upper element 24.

The modified junction box 70, shown in Figs. 6 and 7, may be secured to a wall 71 or other structure of an airplane, for example, to provide for a separable connector between the junction box 10 on the inflatable suit and the sources of supply of pressurized air and oxygen and of electrical energy, in which case the exterior conduits 27, 30 to 34, extending from the detachable junction box 10, may be attached to a duplicate of the terminal element 14, which detachably engages with an element 72. While the element 72 does not have the third conduit 17 of the element 12, as shown in Fig. 4, the element 72 is substantially a duplicate of the element 12 including the valve structures and may be secured to an element 73 by means of screw fasteners 74. A rubber gasket 75 having suitable openings for the fluid and the electrical conduits may be disposed between the elements 72 and 73 to provide against leakage of fluid.

End flanges 76 and 77 integral with the element 73 may be provided for attaching the latter to the wall 71 by screw fasteners 78, although otherwise the element 73 is substantially like the element 13. A connector member 79 for coupling an oxygen conduit from the source of supply and a connector member 80 for coupling an air conduit from the source of supply to the junction box 70 element 73 may be provided. Electrical leads 81 to 84 from sources of electrical energy for the earphones, the microphone, and and the heated suit, are connected to the corresponding electrical conduits in the elements 14 and 72 which are interconnected with the conduits 31 to 34 in a manner like hereinabove described for the elements 12 and 13. Upon the engagement of the elements 14 and 72, the spring type bail 66 may be disposed in a depression 86 in a rib 85 on the element 72 to restrain separating movement of the elements 14 and 72.

In the application to an airplane, for example, conduits from the sources of supply of oxygen, pressurized air, and electrical energy may be connected to the element 73, which may be attached to the wall or other structure of the airplane in an accessible location and to which the element 72 is secured in a manner previously described. The combination of the elements 72 and 73 and the conduits from the sources of supply provides for supplying the fluids and electrical energy to the inflatable suit upon the engagement of the terminal elements 14, including the intermediate conduits 27, 30, 31, to 34, with the elements 12 and 72 respectively, by movement generally in the direction along the wall of the suit and the airplane. As hereinabove described, the engagement of the elements 14, 12, and 72 opens the valves 15 and 16 and interconnects the electrical conduits and the fluid conduits, whereby the sources of supply are in communication with the suit through the wall of the latter.

In normal use of the inflatable suit by the wearer during flight in the region of the stratosphere, the elements 14, 12, and 72 are secured detachably in engagement and are restrained from separating movement by the pivoted spring bail 66 in a manner previously described. However, in an emergency, such as the necessity of a parachute descent to the earth, the wearer may detach rapidly the suit from the conduits by grasping and pulling outwardly a thong 87 attached to the bail 66. Furthermore, should the wearer of the suit neglect to pull the thong 87 before jumping from the airplane, the great strain thereby imposed upon the terminal element 14 is sufficient to distort the spring bail 66 such that the same becomes disengaged at its pivoted mounting 88 from the terminal 14; hence the separation of the terminal element 14 from the element 12 or the element 72 or both may occur. Upon the disengagement the elements 12 or 72 and the terminal 14 the valves 15 and 16 close and prevent leakage of fluid from the suit and from the sources of supply of the same. In order to preserve the life of the wearer of the suit during the parachute descent from the region of the stratosphere to the earth, an emergency oxygen supply bottle, for example, may be attached to the conduit 17 by the wearer for breathing purposes.

Variations may be made without departing from the scope of the invention as it is defined in the following claims.

We claim:

1. A junction box for the connection of respective electrical conduits and fluid conduits through the wall of a hollow body, said box comprising an element adjacent one side of said wall and having a pair of faces, one of said faces seating against said wall and the other face disposed substantially normal thereto, a second element oppositely disposed and immovably secured to the first said element and adjacent the other side of said wall, a terminal element engageable with the first said element at the second said face thereof, means for detachably engaging said terminal element with the first said element by movement substantially parallel to the wall, an electrical conduit and a fluid conduit extending through said elements and said wall, means for interrupting the flow of electrical energy through said electrical conduit by the disengagement of the first said element and said terminal element, a valve structure disposed within the fluid conduit in the first said element and in said terminal element, and means for opening the valve by the engagement of the first said element with said terminal element and to close the valve by the disengagement of the latter said elements.

2. A separable connector for interconnecting respective electrical conduits and fluid conduits providing against leakage of fluid upon the disengagement of the connector and adapted to be supported by a surface, said connector comprising an element having a pair of faces, one of said faces seating against said surface and the other face disposed substantially normal thereto, a terminal element engageable with the first said element at the second said face thereof by movement substantially parallel to said surface, means for detachably engaging said terminal element with the first said element, a plurality of electrical conduits and a plurality of fluid conduits in said elements, plug and socket means for closing and interrupting the electrical path through the conduits, valve structures for controlling the fluid flow in the respective fluid conduits, each said structures having a portion disposed within the fluid conduits of the first said element and having another portion disposed within said fluid conduits of said terminal telement, and means in said portions co-acting to open the valve by the engagement of said elements and to close the valves by the disengagement of said elements.

3. A detachable junction box for an inflatable suit having a wall portion of flexible material for mounting a fluid conduit at one side of the wall in communication with the other side of said wall portion, said junction box comprising an element having a face seating against said wall portion, means for immovably securing and sealing said element to said wall portion, a terminal element engageable with the first said element at a face thereof normal to said wall portion, means for detachably engaging said terminal element with the first said element by movement substantially parallel to the wall, a fluid conduit extending through said elements and said wall portion, a valve structure having a portion disposed within the fluid conduit of the first said element and having a portion disposed within the fluid conduit of said terminal element, and means in the latter said portions co-acting to open the valve by the engagement of said elements and to close the valve by the disengagement of said elements.

4. A detachable junction box for an inflatable suit having a wall section of flexible material for mounting respective electrical conduits and fluid conduits at one side of the wall in communication with the other side of said wall section, said junction box comprising an element having a pair of faces, one of said faces seating against the exterior surface of said wall and the other face disposed generally normal thereto, a second element oppositely disposed to the first said element and having a face seating against the interior surface of said wall in register with the first said element, means for securing said elements to the wall and to each other, a terminal element engageable with the first said element at the second said face thereof, means for detachably engaging said terminal with the first said element by movement generally in the direction along said wall, a plurality of electrical conduits and a pair of fluid conduits extending through said elements and said wall, means for closing and interrupting the electrical path through said electrical conduits, valve structures for controlling the fluid flow in the respective fluid conduits, each said structures having a portion disposed within the fluid conduits of the first said element and having another portion disposed within said fluid conduits of said terminal, means in said portions operable to open the valves by the engagement of the first said element with said terminal element and operable to close the valves by the disengagement of the latter said elements, a third fluid conduit in the first said element in communication with a portion of one of said fluid conduits, said portion extending from the valve structure through the first said element and said second element, a valve element in said third conduit, and means for opening and closing said valve element.

5. In a separable connector for interconnecting a fluid conduit through the wall of an inflatable suit providing against leakage of fluid upon the disengagement of the connector, a body positionable at one side of said wall having a pair of faces, one of said faces being positionable adjacent said wall and the second face being substantially normal thereto and intersecting the first face substantially at said wall, said body having an opening in the second said face, a second body detachably engageable with the first said body at the second said face thereof close to said wall by movement substantially parallel to the wall, means for thus engaging said bodies, said means including an outwardly extending tubular projection of said second body for engaging with the wall of said opening in the first said body, a fluid conduit in said bodies adapted to extend through said wall of said suit, said conduit being in communication with said tubular projection upon engagement of said bodies, and a fluid flow control structure, said structure comprising a pair of spaced-apart disc valve elements, one of said elements being disposed in the first said body and the other element being disposed in said second body, seating elements for said valve elements, one of said seating elements being disposed in the first said body and adapted for sliding engagement with said tubular projection, the latter said seating element comprising an annular ring having an inwardly extending flexible flange for abutting contact with said tubular projection, tubular elements in register with apertures in said disc elements and attached to and extending normal to both faces of each of said disc elements, rod elements slidably engaged with said tubular elements and extending through said apertures for registering the disc valve elements with said seating elements, and means including spring elements contacting faces of said valve elements operable upon the engagement of said bodies for opening said structure and operable upon the disengagement of said bodies for closing said structure.

RUSSELL S. COLLEY.
CARROLL P. KRUPP.